US008219612B2

United States Patent
Le Scouarnec et al.

(10) Patent No.: US 8,219,612 B2
(45) Date of Patent: Jul. 10, 2012

(54) METHOD FOR MANAGING DATA TRANSMISSION BETWEEN PEERS ACCORDING TO LEVELS OF PRIORITY OF TRANSMITTED AND RECEIVED DATA AND ASSOCIATED MANAGEMENT DEVICE

(75) Inventors: Nicolas Le Scouarnec, Rennes (FR); Mary-Luc Champel, Marpire (FR)

(73) Assignee: Thomson Licensing, Boulogne-Billancourt (FR)

( * ) Notice: Subject to any disclaimer, the term of this patent is extended or adjusted under 35 U.S.C. 154(b) by 136 days.

(21) Appl. No.: 12/658,126

(22) Filed: Feb. 3, 2010

(65) Prior Publication Data
US 2010/0205245 A1  Aug. 12, 2010

(30) Foreign Application Priority Data
Feb. 5, 2009  (FR) ...................... 09 50708

(51) Int. Cl.
*G06F 15/16* (2006.01)
(52) U.S. Cl. ......... 709/203; 709/201; 709/230; 709/231
(58) Field of Classification Search .................. 709/203, 709/223–226, 230–233, 237; 370/230, 252, 370/395.3, 393.42, 428, 474, 401, 469, 394, 370/389; 715/700–866
See application file for complete search history.

(56) References Cited

U.S. PATENT DOCUMENTS

| | | | | |
|---|---|---|---|---|
| 7,937,362 | B1 * | 5/2011 | Lian et al. | 707/622 |
| 7,944,832 | B2 * | 5/2011 | Zhang | 370/233 |
| 2008/0005113 | A1 * | 1/2008 | Li | 707/9 |
| 2008/0140853 | A1 * | 6/2008 | Harrison | 709/231 |

OTHER PUBLICATIONS

Bharambe et al., Analyzing and Improving a BitTorrent Network's Performance Mechanisms, Apr. 2006, Proceedings of INFOCOM 2006. 25th IEEE International Conference on Computer Communication.*

Kun Huang et al: "A Dynamic Quota-Based peer Selection Strategy in BitTorrent" Grid and Cooperative Computing, 2007, GCC 2007. Sixth International Conference on, IEEE, PI, 1 aoQt 2007 (Aug. 1, 2007, pp. 267-274.

Niklas Carlsson et al: "Modeling Priority-Based Incentive Policies for Peer-Assisted Content Delivery Systems" May 5, 2008, Networking 2008 AD HOC and Sensor Networks, Wireless Networks, Next General Internet: (Lecture Notes in Computer Science), Springer Berlin Heidelberg, Berlin, Heidelberg, pp. 421-432.

Eger et al: "Bandwith trading in BitTorrent-like P2P networks for content distribution" Computer Communictions, Elsevier Science Publishers BV, Amsterdam, NL vol. 31, No. 2. Jan. 18, 2008, pp. 201-211.

* cited by examiner

*Primary Examiner* — Wing Chan
*Assistant Examiner* — Ruolei Zong
(74) *Attorney, Agent, or Firm* — Tutunjian & Bitetto, P.C.

(57) ABSTRACT

A method dedicated to the management of data transmission in peer to peer mode between peers that can connect to a communication network, each transmission being carried out by a peer, following the reception of a request from another peer, according to a selected reciprocity mechanism. When a peer wants to receive from another peer N blocks of data according to a first priority level $X_k$ selected in a set of at least two different priority levels, in assigning to this peer an exchange value equivalent to a number M of blocks of data to be transmitted to at least one other peer according to a second priority level $X_{k'}$ selected in this set, M being equal to $N*m_{kk'}$, where $m_{kk'}$ is a predetermined value function of the first $X_k$ and second $X_{k'}$ selected priority levels.

10 Claims, 2 Drawing Sheets

Peer-to-Peer (P2P) NETWORK

SCHEMATIC DATA EXCHANGES BETWEEN TWO PEERS

SCHEMATIC DATA EXCHANGES BETWEEN THREE PEERS

SCHEMATIC DATA EXCHANGES BETWEEN
TWO PEERS AND DATA SERVER

METHOD FOR MANAGING DATA TRANSMISSION BETWEEN PEERS ACCORDING TO LEVELS OF PRIORITY OF TRANSMITTED AND RECEIVED DATA AND ASSOCIATED MANAGEMENT DEVICE

This application claims the benefit, under 35 U.S.C. §119 of FR Patent Application 0950708, filed Feb. 5, 2009.

TECHNICAL DOMAIN OF THE INVENTION

The invention relates to the transmission of data, possibly contents (possibly multimedia), in Peer-to-Peer (P2P) mode between peers (items of equipment) that can connect to at least one communication network.

The invention relates to all the communication networks (or infrastructures), whether wired or wireless, capable of transmitting data that can be contents (possibly multimedia) between items of user equipment constituting peers. Therefore, this can be a wired network, such as a global network with medium or high bitrate data transmission lines, like for instance lines of the xDSL type (for "x Digital Subscriber Line") or cables, or optical fibres, or even a wired Ethernet network, or a global wireless network, for example of the mobile (or cellular) type, or a wireless network of the local (or proximity) type (WLAN ("Wireless Local Area Network"—IEEE 802.11a, WiFi (802.11g), ETSI HiperLAN/2), WiMAX (IEEE 802.16, ETSI HiperMAN), and Bluetooth standards).

Moreover, it is understood here by "peer (item of equipment)" any type of equipment that can exchange data with other peers or items of network equipment, in peer to peer (or P2P) mode, in that it comprises at least one executable P2P type communication application, such as for example a video stream broadcast application (for example a Video on Demand (VoD) application). Therefore, this can be, for example, a fixed or portable computer, a fixed or mobile (or cellular) telephone, a personal digital assistant (or PDA, including a "pocket PC") a content receiver (such as, for example, a decoder, a residential gateway or a STB (Set-Top Box)).

Finally, "content" is understood here to mean a set of data that defines a television or video or audio programme (radio or musical) or games or multimedia, or an electronic file (or data).

PRIOR ART

As those skilled in the art know, in a P2P environment, the correct operation of some applications depends heavily on the cooperation between peers, as it is the peers that contribute jointly to the broadcasting of data, particularly of contents. This is particularly the case for some P2P video stream broadcast applications, such as for example video on demand (or VoD). In this application type, a peer that wants to recover data that it has not yet received must transmit requests to one or several other peers, and a peer that receives such a request must, if it possesses the required data, transmit it to the peer that requested it.

At certain times, a P2P application may be pressed to recover data as it will soon have need of it to continue to operate correctly. In order to enable a peer to recover data that it will very shortly require more rapidly, a high priority level can be associated with the requests that it transmits, while the requests relating to data that will be used later are associated with at least one lower priority level.

The disadvantage incurred by an operating mode based on requests of variable priority levels, resides in the fact that some peers abuse or take advantage of requests associated with the highest priority level. These peers monopolize the network resources in order to be systematically served before the other peers, and therefore benefit from very favourable data obtaining conditions, to the detriment of other peers.

To avoid the aforementioned abuse, it is possible to implement a reciprocal incentive mechanism, such as for example a "tit for tat" type mechanism (reciprocity known as direct reciprocity) or of reputation type (reciprocity known as indirect reciprocity).

The tit for tat mechanism consists in authorizing a first peer to recover N blocks of data according to a given priority level from a second peer, provided that this first peer commits to transmit to the second peer N blocks of data according to this same given priority level if it makes the request. If subsequently the first peer refuses to transmit N blocks of data according to the given priority level of the second peer, then this latter ceases all cooperation with the first peer, so as to penalise it for its lack of cooperation. This mechanism is notably used by the P2P application Bittorent and described in the document by Brahm Cohen "Incentives build robustness in Bittorent", P2P Econ 2003.

The main disadvantage of this tit for tat mechanism resides in the fact that the peers that do not abuse recoveries of data according to the highest priority level find themselves penalised, and therefore recover their data more slowly. They are then, in a way, incited to behave like those that abuse the highest priority level, so that rapidly a situation is attained where almost all the peers use the highest priority level which is the same as functioning without a priority level.

The reputation mechanism consists in associating with each peer a virtual type monetary or confidence value, that varies over time according to its behaviour in terms of data transmission. The more a peer uses requests associated with a high priority level, the more its virtual monetary or confidence value is reduced and therefore the less it will be able to use new requests associated with a high priority level. Conversely, the more a peer transmits to other peers data associated with a high priority level, the more its virtual monetary or confidence value is increased.

The main disadvantage of this reputation mechanism resides in the fact that the peers can agree to make the P2P environment believe that they effectively exchange data (whatever the priority level) that enables them to increase in an abusive way their virtual monetary or confidence value, which is relatively difficult to overcome

SUMMARY OF THE INVENTION

The purpose of the invention is therefore to improve the situation, and more specifically to preserve the usefulness of priority levels within a P2P environment in the presence of a reciprocity mechanism.

For this purpose, the invention first proposes a method, dedicated to the management of data transmission in peer to peer mode between peers that can connect to at least one communication network, each transmission being carried out by a peer, following the reception of a request from another peer, according to a selected reciprocity mechanism.

This method is characterized in that it consists, when a peer wants to receive from another peer N blocks of data according to a first priority level $X_k$ selected in a set of at least two different priority levels, in assigning to this peer an exchange value that equals a number M of blocks of data to be transmitted to at least one other peer according to a second priority level $X_{k'}$ selected in this set, M being equal to $N*m_{kk'}$, where $m_{kk'}$ is a predetermined value function of the first $X_k$ and second $X_{k'}$ selected priority levels.

The method according to the invention can comprise other characteristics that can be taken individually or in combination, and notably:
- in the presence of a tit for tat type reciprocity mechanism, the exchange value can be equal to the number M of blocks of data that the applicant peer commits to transmit to at least one other peer according to the second priority level selected $X_{k'}$ in exchange for the reception of N blocks of data according to the first priority level selected $X_k$,
- as a variant, in the presence of a "reputation" type reciprocity mechanism in which each peer is associated with a virtual monetary or confidence value that varies over time according to its behaviour in terms of transmission of data, the exchange value can be subtracted from the virtual monetary or confidence value of the peer in exchange for the reception of N blocks of data according to the first selected priority level $X_k$,
- the set can comprise at least one high priority level $X_1$, one normal priority level $X_2$ and one low priority level $X_3$,
- the set can also comprise an additional priority level $X_4$ that is associated with a transmission of blocks of data by the data server,
  - in the case of a request of a peer requesting the data server to transmit N blocks of data to it according to the additional priority level $X_4$, the data server can only proceed to this transmission on condition that this applicant peer has previously transmitted data to a predetermined item of communication equipment, such as for example (and not restrictively) another peer, the data server or a dedicated server connected to the communication network,
  - in the case of a request of a peer requesting the data server to transmit N blocks of data according to the additional priority level $X_4$, the data server can only proceed to this transmission on condition that this applicant peer requests this transmission type according to a frequency less than a selected threshold,
  - in a first variant, in the case of a request of a peer requesting the data server to transmit N blocks of data to it according to the additional priority level $X_4$, the data server can determine the frequency according to which this applicant peer requests this transmission type, and, if this determined frequency is greater than a selected threshold, the data server can request the banishment of this applicant peer from the peer to peer environment,
  - in a second variant, in the case of a request of a peer requesting the data server to transmit N blocks of data to it according to the additional priority level $X_4$, the data server can determine the frequency according to which this applicant peer requests this transmission type, and, if this determined frequency is greater than a selected threshold, the data server can alert the other peers of the behaviour of this applicant peer so that they modify their behaviour with respect to it,
    - the data server can for example proceed to the requested transmission whatever the determined frequency, or he can only proceed to the requested transmission if the determined frequency is less than the selected threshold.

The invention also proposes a device dedicated to the management of data transmissions in peer to peer mode by a peer (in which runs at least one peer to peer type communication application and which is connected to at least one communication network), each transmission being carried out by this peer, following the reception of a request from another peer, according to a selected reciprocity mechanism.

This device is characterized by the fact that it is arranged, when its peer wants to receive from another peer N blocks of data according to a first priority level $X_k$ selected in a set of at least two different priority levels, to assign to its peer an exchange value equivalent to a number M of blocks of data to be transmitted to at least one other peer according to a second priority level $X_{k'}$ selected in this set, M being equal to $N*m_{kk'}$, where $m_{kk'}$ is a predetermined value function of the first $X_k$ and second $X_{k'}$ selected priority levels.

The device according to the invention can comprise other characteristics that can be taken separately or in combination, and notably:
- it can be arranged, in the presence of a tit for tat type reciprocity mechanism, to assign to its peer an exchange value equal to the number M of blocks of data that its applicant peer must transmit to at least one other peer according to the second priority level selected $X_{k'}$ in exchange for the reception of N blocks of data according to the first priority level selected $X_k$,
- as a variant, it can be arranged, in the presence of a "reputation" type reciprocity mechanism in which each peer is associated with a virtual monetary or confidence value that varies over time according to its behaviour in terms of transmission of data, to subtract the exchange value from the virtual monetary or confidence value of its peer in exchange for the reception of N blocks of data according to said first selected priority level $X_k$,
- it can be arranged to manage a set of priority levels that comprise at least one high priority level $X_1$, a normal priority level $X_2$ and a low priority level $X_3$, as well as possibly an additional priority level $X_4$ that is associated with a transmission of blocks of data by a data server,
- it can be arranged, when its peer wants to request the data server to transmit to it N blocks of data according to the additional priority level $X_4$, to command its peer to transmit prior to its transmission request, data to a predetermined item of communication equipment connected to a communication network.

The invention also proposes a peer comprising at least one communication application of the peer-to-peer type and a device for the management of data transmission in peer to peer mode of the type of that presented above.

BRIEF DESCRIPTION OF THE DRAWINGS

Other characteristics and advantages of the invention will appear upon examination of the detailed description hereafter, and the annexed drawings, wherein.

The annexed drawings can be used not only to complete the invention, but also to contribute to its definition, if necessary.

DETAILED DESCRIPTION

The purpose of the invention is to enable the transmission of data in peer to peer (or P2P) mode between peers of a constituted P2P network via at least one communication network.

In what follows, it is considered in a non-restrictive manner that the (communication) network is a global wired network (for example of ADSL type) for example providing access to the Internet (IP—"Internet Protocol") and ensuring connectivity between all the peers (equipment) of a P2P network. But, the invention is not limited to this type of communication network. It relates in fact to all types of communication networks (or infrastructures) having at least an access network, wired and/or wireless, and capable of transmitting contents data (possibly multimedia) between peers (equipment). Therefore, the access network can be a wired network, such as a cable or optical fibre or Ethernet network, or a wireless network, such as a mobile (or cellular) network or a local area network (WLAN, WiMAX and Bluetooth standards).

Moreover, it is considered in what follows, as a non-restrictive example, that the peers (equipment) (Pj) are fixed or portable computers, fitted with at least one executable P2P type communication application (A). But the invention is not limited to this type of peer equipment. It concerns in fact any type of equipment capable of exchanging data with other peers or items of network equipment, via at least one communication network (or infrastructure). It can therefore also relate to fixed or mobile (or cellular) telephones, personal digital assistants (or PDAs, including "pocket PCs"), content receivers (such as for example decoders, residential gateways or STBs ('Set-Top Boxes')), for example.

In addition, it is considered in what follows, as a non-restrictive example, that the data transmitted between peers are video type contents, and that this transmission is made in the context of a video on demand (or VoD) service. But, the invention is not restricted to this data type, nor to this service (or application) type. It relates in fact to any data type, and particularly to content data (television programme or video or audio (radio or musical) or games or multimedia, or computer (or "data") files), and any service enabling the provision of data to at least one P2P communication application requiring (at least two) data transmission priority levels.

Figure 1:
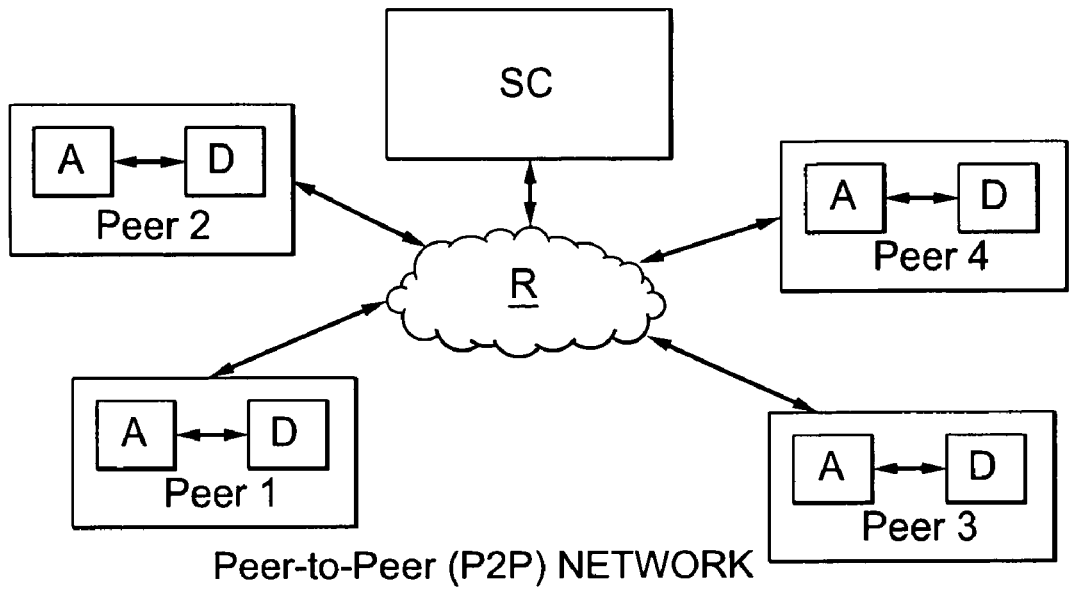
FIG. 1 shows in a very diagrammatic and functional way a P2P network constituted by peers, equipped with a management device according to the invention and connected to each other via a wired network.

A peer to peer (or P2P) network is schematically illustrated in FIG. 1 constituted of peers Pj (here they are computers) capable of exchanging between each other content data via their communication means (such as for example modems) and via at least a first communication network R. The index j here takes values comprised between 1 and 4, but it can take any value comprised between 1 and P, with P greater than or equal to 2.

The data (here contents) that are exchanged between peers Pj within the P2P network are for example from at least one data server SC (here in the context of a video on demand broadcast service). This service can for example be controlled by the data server SC, connected to the (communication) network R. But, it can be controlled by another server, for example a services server, coupled to the data server SC and connected to the (communication) network R, or by a system distributed over the set of peers Pj (each peer Pj thus committing to generate part of the information relating to the service).

The invention proposes notably a management method enabling data (here contents) to be transmitted in peer to peer mode between peers Pj, in the presence of priority levels and a reciprocity mechanism.

Each transmission carried out by a peer Pj is made following the reception of a request that issues from another peer Pj' (j'≠j) and according to a selected reciprocity mechanism, such as for example a tit for tat (direct reciprocity) type mechanism, or a reputation (indirect reciprocity) type mechanism.

The method according to the invention is implemented each time a first peer Pj wants to receive from a second peer Pj' N blocks of data according to a first priority level $X_k$ that is selected in a set of at least two different priority levels.

We are informed that a first peer Pj wants to recover data from a second peer Pj' when the first peer Pj generates a data recovery request intended for the second peer Pj'.

It is considered in what follows, provided as a non-restrictive example, that the set comprises four (k=1 to 4) priority levels: a high priority level $X_1$ (k=1), a normal priority level $X_2$ (k=2), a low priority level $X_3$ (k=3), and an additional priority level $X_4$ (k=4) that is specifically associated with the transmission of blocks of data by the (one) data server SC at the explicit request of a peer Pj (in this case, the data server SC can also be considered as a peer, in particular if it concerns a peer (called a "seeder") that has all the contents and therefore only serves other peers) and that is preferably the highest priority level. But, the invention is not restricted to this number of priority levels. It applies in fact whenever at least two priority levels are utilized.

Each time the aforementioned situation arises (generation of a data recovery request), an exchange value that equals a number M of blocks of data to be transmitted to at least one other peer Pj' or Pj" (j'≠j"≠j) according to a second priority level $X_{k'}$ selected in the aforementioned set, is assigned to a first applicant peer Pj. It is noted that the first $X_k$ and second $X_{k'}$ selected priority levels can be identical or different. The number M is equal to $N*m_{kk'}$, where $m_{kk'}$ is a predetermined value that is a function of the first $X_k$ and second $X_{k'}$ priority levels that were selected.

It is important to note that M is the number of blocks to be transmitted in exchange so that the reputation of a peer remains unchanged (constant). It is in fact only possible to immediately transmit part of M blocks as it can not be done otherwise at the considered instant, which causes a momentary reduction in the reputation.

This assigning of an exchange value can for example be carried out by a data transmission management device D according to the invention that is part of the applicant peer Pj (as illustrated in a non-restrictive manner), or that is coupled with this latter (Pj).

It will be noted that each management device D according to the invention can be implemented in the form of software modules. But, it can also be implemented in part or entirely in the form of electronic circuits (hardware) or in a combination of software modules and electronic circuits.

This (management) device D can for example analyze messages (particularly requests) that are generated and received by the peer Pj with which it is associated and that relate to the locally related P2P application A, in order to proceed to the assignment of an exchange value when it detects that its peer Pj wants to recover data from at least one other peer Pj', or that its peer Pj has transmitted data to another peer Pj'. It will also, preferably, monitor the actions of other peers Pj' in order to ensure that they are acting normally and to perform its calculations according to these actions.

The exchange value type that is assigned to an applicant peer Pj depends on the reciprocity mechanism type that is implemented within the P2P network.

For example, in the presence of a tit for tat type reciprocity mechanism, the exchange value can be equal to the number M of blocks of data that the applicant peer Pj commits to transmit to at least one other peer Pj' according to the second priority level selected $X_{k'}$ in exchange for the reception of N blocks of data according to the first priority level selected $X_k$.

The different exchange values $m_{kk'}$ can for example be stored by the device D in the form of a correspondence table that can be represented, as an example, in the form of the following table (that corresponds to request for recovery of a single (N=1) block of data—to know the exchange value for N blocks, it suffices to multiply $m_{kk'}$ by N).

|  | Exchange value $m_{kk'}$ for commitment to transmission according to $X_1$ | Exchange value $m_{kk'}$ for commitment to transmission according to $X_2$ | Exchange value $m_{kk'}$ for commitment to transmission according to $X_3$ |
|---|---|---|---|
| Reception of 1 block according to $X_4$ (from CS) | not provided for | not provided for | of (c · b · a) blocks |
| Reception of 1 block according to $X_1$ | of 1 block | of b blocks | of (b · a) blocks |
| Reception of 1 block according to $X_2$ | of 1/b block | of 1 block | of a blocks |
| Reception of 1 block according to $X_3$ | of 1/(b · a) block | of 1/a block | of 1 block |

The variables a, b and c are numbers strictly greater than 1. It will be noted that these variables a, b and c can be identical or different values according to the requirements of the P2P network considered.

It is understood from the preceding correspondence table that:
- if a peer Pj wants to receive from another peer Pj' 1 block of data according to the priority level $X_1$, then it must commit to transmit to at least one other peer Pj' either 1 block of data according to priority level $X_1$, or b blocks of data according to priority level $X_2$, or again (b*a) blocks of data according to priority level $X_3$,
- if a peer Pj wants to receive from another peer Pj' 1 block of data according to the priority level $X_2$, then it must commit to transmit to at least one other peer Pj' either 1/b block of data according to priority level $X_1$, or 1 block of data according to priority level $X_2$, or again a blocks of data according to priority level $X_3$,
- if a peer Pj wants to receive from another peer Pj' 1 block of data according to the priority level $X_3$, then it must commit to transmit to at least one other peer Pj' either 1/(b*a) block of data according to priority level $X_1$, or 1/a block of data according to priority level $X_2$, or again 1 block of data according to priority level $X_3$, and
- if a peer Pj wants to receive from the data server SC 1 block of data according to the priority level $X_4$, then it must commit to transmit to at least one other peer Pj' (c*b*a) blocks of data according to the priority level $X_3$.

The result of this correspondence table example is that the peers Pj are all the more penalised as they use high priority levels, such as for example $X_1$ and $X_4$, to recover data. The level of penalisation can be as high as you like, as it depends directly on the values that are assigned to a, b and c.

Figure 2:
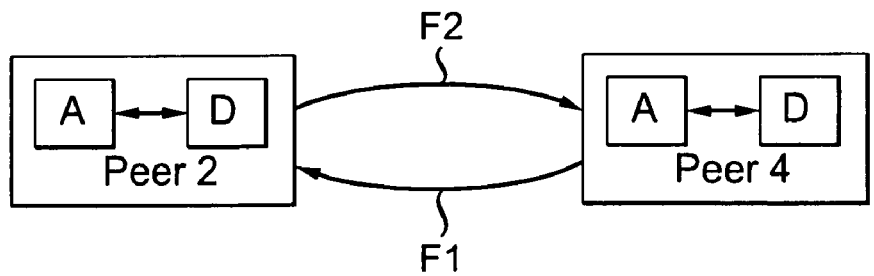
FIG. 2 shows very schematically data exchanges between two peers according to the invention in the presence of a tit for tat type reciprocity mechanism adapted according to the invention.
Figure 3:
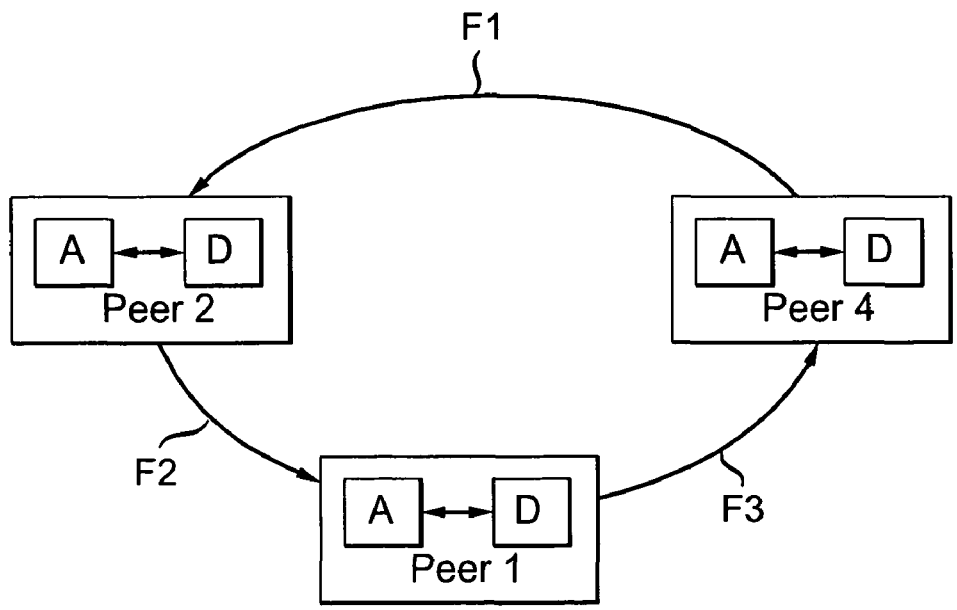
FIG. 3 shows very schematically data exchanges between three peers according to the invention in the presence of a tit for tat type reciprocity mechanism adapted according to the invention.
Figure 4:
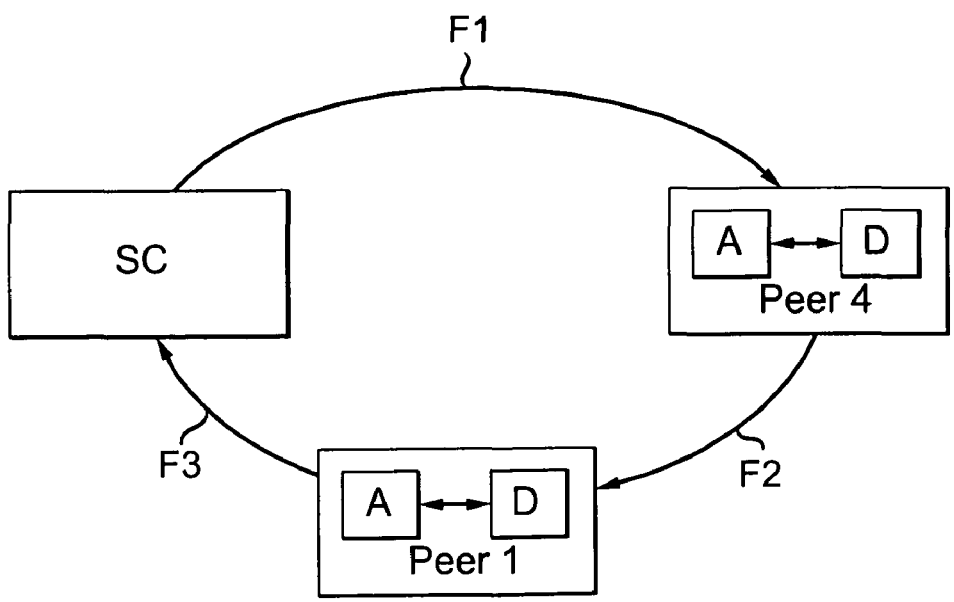
FIG. 4 shows very schematically data exchanges between two peers according to the invention and a data server in the presence of a tit for tat type reciprocity mechanism adapted according to the invention.

On FIGS. 2 to 4 three different examples of data recovery in the presence of a tit for tat type mechanism adapted according to the invention are schematically represented.

In the first example shown in FIG. 2, it is considered that the peer P2 has request from the peer P4 the transmission of 5 (N=5) blocks of data according to the priority level $X_1$. Its device D, that uses the information from the preceding correspondence table, decides then, for example, to assign to it an exchange value M equal to 5*b blocks so that it commits to transmit to the peer P4, in exchange, 5*b blocks according to the priority level $X_2$. It will be noted that this decision can be imposed by a request received from the peer P4 and requesting data according to the priority level $X_2$. On reception of this request, the peer P4 transmits the 5 requested blocks' to the peer P2 according to the priority level $X_1$ (arrow F1 in FIG. 2). And a little later or noticeably simultaneously, to the request of the peer P4, the peer P2 transmits to the peer P4 5*b blocks according to the priority level $X_2$ (arrow F2 in FIG. 2).

It will be noted that in order to ensure that another peer does not abuse it is possible, for example, to transmit to it a first block, then await the reception of b blocks, then transmit to it a second block, than again await the reception of blocks, so that the transmission between the peers concerned is as simultaneous as possible (and that the peer that abuses is sanctioned as quickly as possible).

In the second example shown in FIG. 3, it is considered that the peer P2 has requested from the peer P4 the transmission of 10 (N=10) blocks of data according to the priority level $X_2$, but that it possesses data that are of interest only to the peer P1 and not the peer P4. The device D of the peer P2, that uses the information from the preceding correspondence table, decides then, for example, to assign to it an exchange value M equal to 10/b blocks so that it commits to transmit to the peer P1, in exchange, 10/b blocks according to the priority level $X_1$. It will be noted that this decision can be imposed by a request received from the peer P1 and requesting data according to the priority level $X_1$. On reception of the request from the peer P2, the peer P4 transmits the 10 requested blocks to the peer P2 according to the priority level $X_2$ (arrow F1 in FIG. 3). A little later or noticeably simultaneously, to the request of the peer P1, the peer P2 transmits to the peer P1 10/b blocks according to the priority level $X_1$ as an exchange for what it has received from the peer P2 (arrow F2 in FIG. 3). The peer P1 must then transmit in its turn blocks to the peer P4 in exchange for that which it has received from the peer P2 according to the priority level $X_2$. For example the device D of the peer P1, that uses the information from the preceding correspondence table, decides to assign to it an exchange value M equal to ((10/b)*b) blocks so that it commits to transmit to the peer P4, in exchange, 10 (10b/b =10) according to the priority level $X_2$. It will be noted that this decision can be imposed by a request received from the peer P4 and requesting data according to the priority level $X_2$. And a little later or noticeably simultaneously, to the request of the peer P4, the peer P1 transmits to the peer P4 10 blocks according to the priority level $X_2$ (arrow F3 in FIG. 3).

In the third example illustrated in FIG. 4, it is considered that the peer P4 has requested from the data server SC the transmission of 20 (N=20) blocks of data according to the priority level $X_4$ as the other peers of the P2P network did not possess them, but it possess data that is of interest only to the peer P1 and not to the data server SC. The device D of the peer P4, that uses the information from the preceding correspondence table, decides then, for example, to assign to it an exchange value M equal to 20*(c*b*a) blocks so that it commits to transmit to the peer P1, in exchange, 20*(c*b*a) blocks according to the priority level $X_3$. On reception of the request from the peer P4, the data server SC transmits the 20 requested blocks to the peer P4 according to the priority level $X_4$ (arrow F1 in FIG. 4). A little later or noticeably simultaneously, to the request of the peer P1, the peer P4 transmits to the peer P1 20*(c*b*a) blocks according to the priority level $X_3$ as an exchange for what it has received from data server SC (arrow F2 in FIG. 4). The peer P1 must then transmit in its turn blocks to data server SC in is exchange for that which it has received from the peer P2 according to the priority level $X_3$. For example the device D of the peer P1, that uses the information from the preceding correspondence table, decides, to assign to it an exchange value M equal to 20*(c*b*a) blocks so that it commits to transmit to the peer P4, in exchange, 20*(c*b*a) blocks according to the priority level $X_3$. It will be noted that this decision can be imposed by a request received from the peer P4 and requesting data according to the priority level $X_3$. And a little later or noticeably simultaneously, the peer P1 transmits to the data server SC 20*(c*b*a) blocks according to the priority level $X_3$ (arrow F3 in FIG. 4). It will be noted that the blocks that are transmitted to the data server SC can have no value (they are in fact essentially intended to prove that the peer P1 acts in exchange for the service that was provided to it).

It will be noted that it is the device D of a peer Pj that can for example store in a memory the cumulated exchange values (and therefore current (or updated)) that its peer Pj possesses with respect to each other peer Pj' of the P2P network.

If now a reputation type reciprocity mechanism is used in which each peer Pj is associated with a virtual monetary or confidence value that varies over time according to its behaviour in terms of transmission of data, then the exchange value can for example be subtracted from the current virtual monetary or confidence value of an applicant peer Pj in exchange for the reception of N blocks of data according to the first selected priority level $X_k$.

It will be understood that in this case, a peer Pj does not owe exchange to one or several other specific peers Pj' (those from which it has requested data), but to the set of the P2P network peers. Consequently, the current virtual monetary or confidence value of a peer Pj corresponds to the accumulation of exchange values that were successively assigned to this peer Pj in exchange for all the data that were transmitted to it by the other peers Pj' on its request, but also in exchange for all the data that it has transmitted to the other peers Pj' on their request.

It is preferably the device D of a peer Pj that assigns an exchange value to its peer Pj each time that this latter (Pj) transmits data to another peer Pj' on its request. Consequently, when a peer Pj transmits data to another peer Pj' according to a requested priority level $X_k$ the device D of this peer adds to the current virtual monetary or confidence value of its peer Pj an exchange value that is a function of the number of blocks of data that its peer Pj has transmitted according to this requested priority level $X_k$. This addition of exchange value is a sort of compensation.

It will also be noted that the device D of a peer Pj can also store the current virtual monetary or confidence value of each peer Pj' with which it exchanges blocks of data (or even of its P2P network). In this case, the device D of a peer Pj, that transmits data to another peer Pj' on its request, can assign an exchange value to this other peer Pj' when its peer Pj transmits data to it. More specifically, it removes from the virtual monetary or confidence value of this peer Pj' (that it stores), the exchange value that is a function of the number of blocks of data that its peer Pj transmitted to it according to the requested priority level $X_k$, in order to update this virtual value. Then, it can transmit to the other peers of its P2P network the virtual value that it has just updated. This is more particularly of interest when a reputation mechanism is being used.

It will be noted that in the presence of a specific priority level $X_4$ for the recovery of data from the data server SC, when a peer Pj requests from the data server SC that it transmits to it N blocks of data according to the priority level $X_4$, it can be considered that the data server SC does not proceed to this transmission except on condition that the applicant peer Pj has previously transmitted data to a predetermined item of communication equipment that is connected to the communication network R. This refinement is intended to penalise peers that would want to recover data from the data server SC too frequently. The penalty consists here in forcing a peer to consume (precious) bandwidth in transmitting data of any type, for example data of no interest, so that it can then have the right to recover data from the data server SC.

The predetermined communication equipment to which a peer Pj must transmit data can be the data server SC. This is practical as this enables the time necessary for the making of a decision relative to the acceptation or refusal to transmit data of the data server SC to be reduced. But, this predetermined communication equipment can also be another peer Pj' or a dedicated server that is connected to the communication network R.

At least five variants can be envisaged to determine if a peer is authorized or not to recover data from the data server SC. These five variants have a common initial first step but different final second steps.

The first step is triggered when the data server SC receives from a peer Pj a request asking it to transmit N blocks of data according to the priority level $X_4$. In this case, the data server SC can only proceed to this transmission on condition that the applicant peer Pj does not require this type of transmission too frequently. For example, the data server SC can maintain updated for each peer Pj the frequency according to which this peer Pj addresses data recovery requests to it. In this case, when the data server SC receives a request from a peer Pj, it compares the current frequency of this peer Pj with a selected (frequency) threshold.

The second step uses the result of the comparison carried out during the first step.

In the first variant, the data server SC only satisfies the request of the peer Pj on condition that the current frequency of this peer Pj is less than the selected threshold. If the current frequency of the applicant peer Pj is greater than the selected threshold, then the data server SC does not satisfy the request of the peer Pj.

In the second variant, the data server SC only satisfies the request of the peer Pj on condition that the current frequency of this peer Pj is less than the selected threshold. But, if the current frequency of the applicant peer Pj is greater than the selected threshold, then not only does the data server SC not satisfy the request of the peer Pj but in addition it requires the banishment of the applicant peer Pj from the P2P environment.

In the third variant, the data server SC satisfies the request of the peer Pj whatever the current frequency of this peer Pj, and, if this current frequency is greater than the selected threshold, then the data server SC requires the banishment of the applicant peer Pj from the P2P environment.

In the fourth variant, the data server SC only satisfies the request of the peer Pj on condition that the current frequency of this peer Pj is less than the selected threshold. But, if the current frequency of the applicant peer Pj is greater than the selected threshold, then not only does the data server SC not satisfy the request of the peer Pj but in addition it informs the other peers Pj' of the behaviour of this applicant peer Pj so that they modify their behaviour with respect to it.

In the fifth variant, the data server SC satisfies the request of the peer Pj whatever the current frequency of this peer Pj, and, if this current frequency is greater than the selected threshold, then the data server SC informs the other peers Pj' of the behaviour of this applicant peer Pj so that they modify their behaviour with respect to it.

It is important to note that the rules that define a reciprocity mechanism adapted according to the invention are an integral part of the communication protocol that is used to implement this reciprocity mechanism. Consequently, this reciprocity mechanism can only be attacked with great difficulty by a malicious person.

The invention is not restricted to embodiments of the management device, of the peer equipment and management method described above, provided only as a non-restrictive example, but includes all the variants that can be envisaged by those skilled in the art in the framework of the following claims.

The invention claimed is:

1. Method for managing the transmission of data in peer to peer mode between peers connected to at least one communication network, each transmission being carried out by a peer following the reception of a request from another peer, according to a selected reciprocity mechanism of a tit for tat type, the method comprising:
   assigning an exchange value to a first peer, when the first peer wants to receive from a second peer N blocks of data according to a first priority level $X_k$ selected in a set of at least two different priority levels,
   wherein said exchange value is equivalent to a number M of blocks of data that said first peer commits to transmit to at least one other peer according to a second priority level $X_k'$ selected in said set, in exchange for the reception of N blocks of data according to said first priority level selected $X_k$, M being equal to $N*m_{kk'}$, where $m_{kk'}$ is a predetermined value function of said first $X_k$ and second $X_{k'}$ selected priority levels.

2. Method according to claim 1, wherein said set comprises at least one high priority level $X_1$, one normal priority level $X_2$ and one low priority level $X_3$.

3. Method according to claim 2, wherein said set also comprises an additional priority level $X_4$ associated with a transmission of blocks of data by a data server.

4. Method according to claim 3, wherein in the case of a request of a peer requesting said data server to transmit to it N blocks of data according to said additional priority level $X_4$, said data server only proceeds to said transmission on condition that said first peer has previously transmitted data to a predetermined item of communication equipment connected to said communication network.

5. Method according to claim 4, wherein said predetermined communication equipment is selected in a group comprising a third peer, said data server and a dedicated server connected to said communication network.

6. Device for managing transmission of data in peer to peer mode for a peer connected to at least one communication network, each transmission being carried out by said peer, following the reception of a request from another peer, comprising:
   a selected reciprocity mechanism of a tit for tat type that includes a processor configured to assign an exchange value to a first peer when said first peer wants to receive from a second peer N blocks of data according to a first priority level $X_k$ selected in a set of at least two different priority levels,
   wherein said exchange value is equivalent to a number M of blocks of data that said first peer must transmit to at least one other peer according to a second priority level $X_{k'}$ selected in said set in exchange for the reception of N blocks of data according to said first priority level selected $X_k$, M being equal to $N*m_{kk'}$, where $m_{kk'}$ is a predetermined value function of said first $X_k$ and second $X_{k'}$ selected priority levels.

7. Device according to claim 6, wherein it is arranged to manage a set of priority levels comprising at least one high level of priority $X_1$, one normal level of priority $X_2$ and one low level of priority $X_3$.

8. Device according to claim 7, wherein it is arranged to manage a set of priority levels also comprising an additional priority level $X_4$ associated with a transmission of blocks of data by a data server.

9. Device according to claim 8, wherein it is arranged, when said first peer wants to request said data server to transmit to it N blocks of data according to said additional priority level $X_4$, to command said peer to transmit prior to its transmission request, data to a predetermined item of communication equipment connected to said communication network.

10. A peer device for transmission and reception of data in peer to peer mode and connected to at least one communication network, the peer device comprising:
   a transmission management device for managing transmission of data in peer to peer mode that includes a processor configured to receive an exchange value when the peer requests N blocks of data according to a first priority level Xk selected in a set of at least two different priority levels,
   wherein said exchange value is equivalent to a number M of blocks of data that said first peer must transmit to at least one other peer according to a second priority level $X_{k'}$ selected in said set in exchange for the reception of N blocks of data according to said first priority level selected $X_k$, M being equal to $N*m_{kk'}$, where $m_{kk'}$ is a predetermined value function of said first $X_k$ and second $X_{k'}$ selected priority levels.

* * * * *